Patented Aug. 14, 1928.

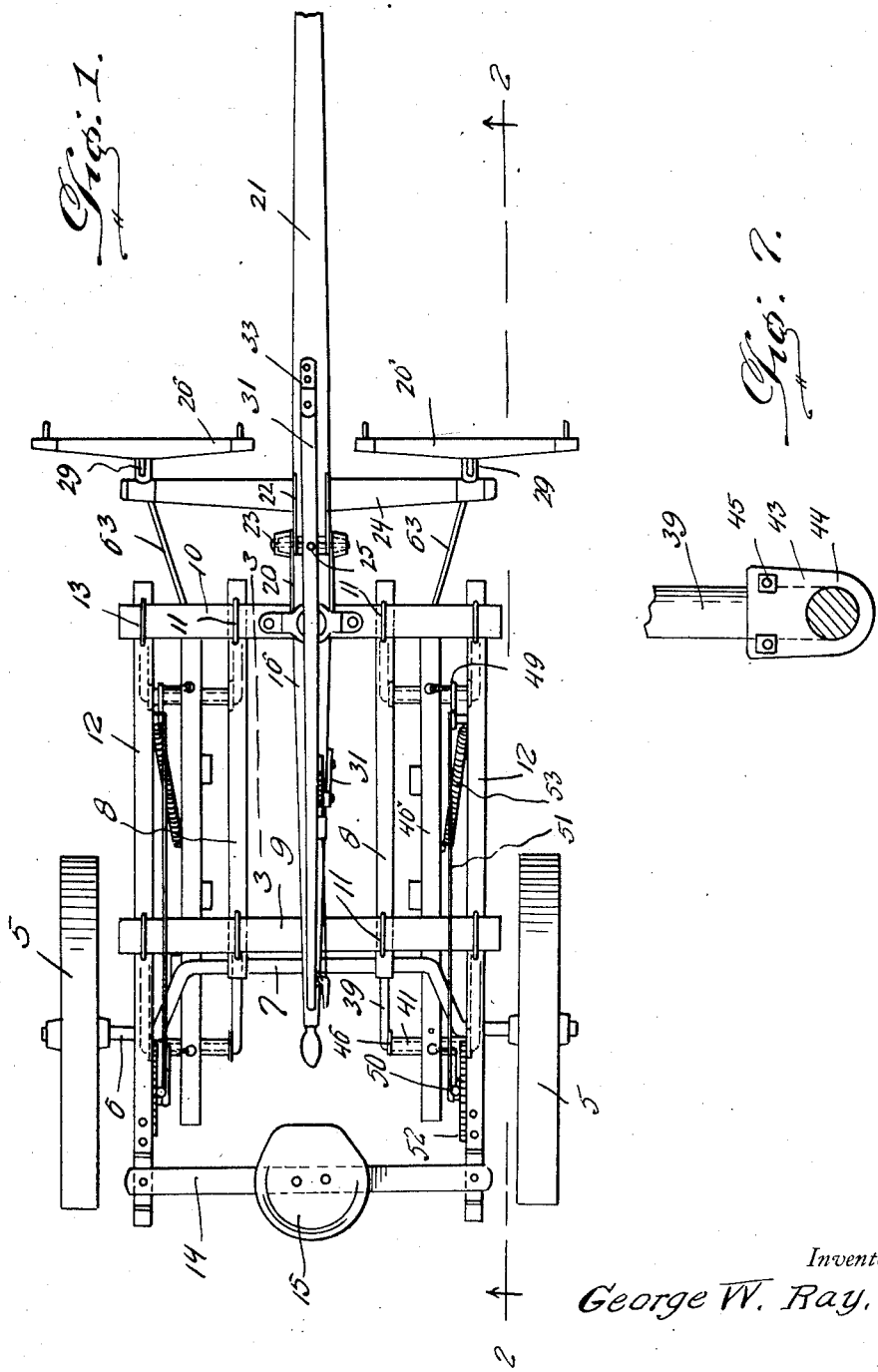

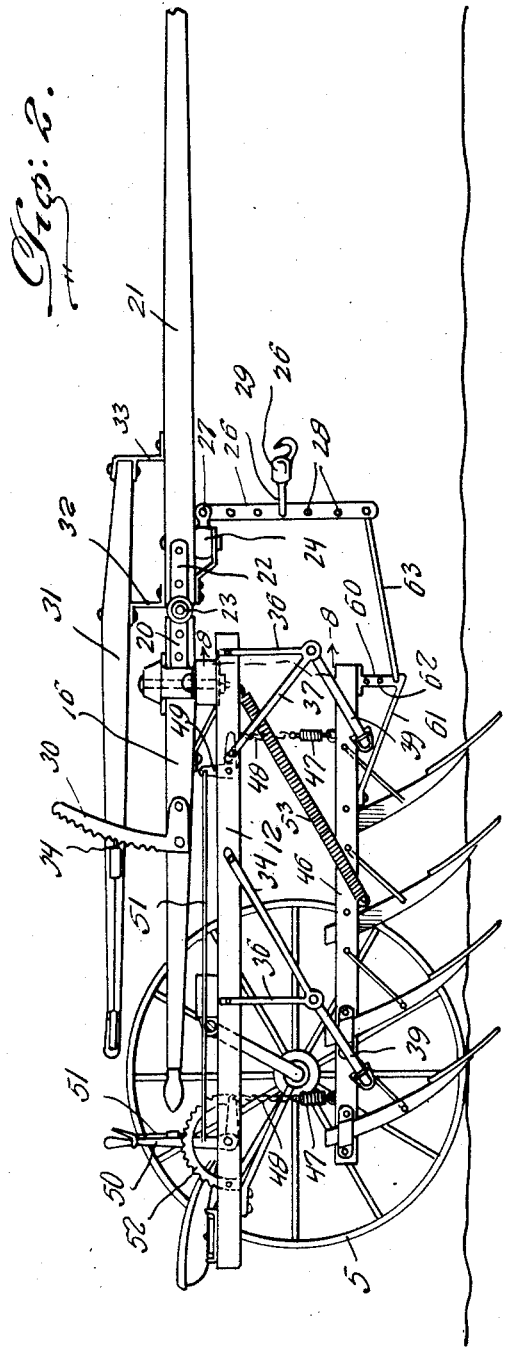

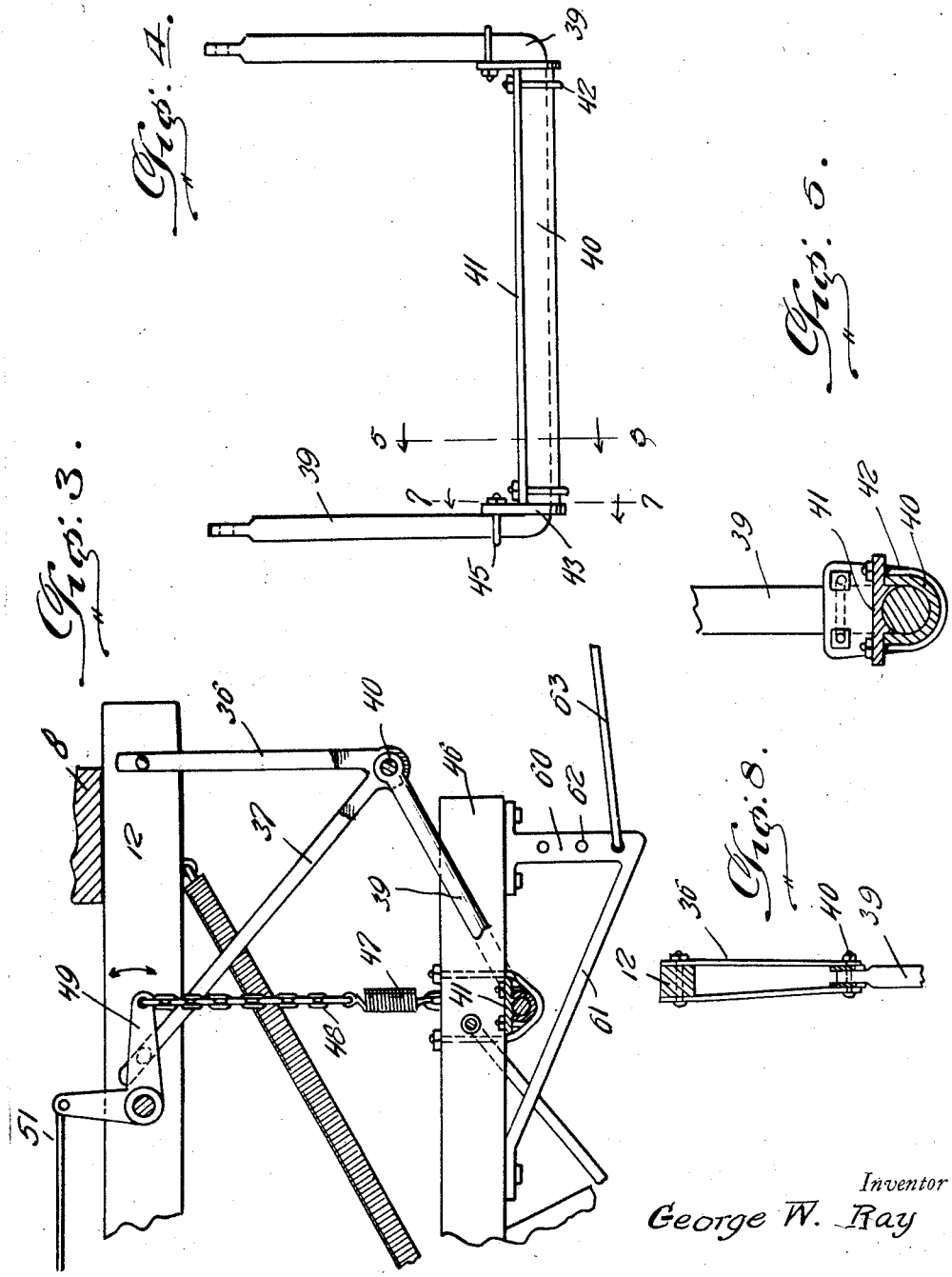

1,680,914

UNITED STATES PATENT OFFICE.

GEORGE W. RAY, OF FORTY FORT, PENNSYLVANIA.

CULTIVATOR.

Application filed March 3, 1927. Serial No. 172,413.

The present invention relates to a cultivating apparatus and has for its prime object to provide a cultivator having the parts thereof adjustable in relation to each other so that the cultivator may be used to the best advantage to obtain the maximum of efficiency.

Another very important object of the invention lies in the provision of a wheeled cultivator having a lever swingable horizontally thereon and a crank swingable vertically on the lever whereby the wheel cultivator may be disposed at different horizontal and vertical angles in relation to the crank.

Another very important object of the invention lies in the provision of a cultivator of this nature having means whereby the cultivating element may be raised and lowered with respect to the ground in a convenient and easy manner.

A still further very important object of the invention resides in the provision of a cultivating apparatus of this nature that is comparatively simple in its construction, strong and durable, thoroughly reliable, easy to manipulate in its various adjustments, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the cultivating apparatus embodying the features of my invention, Figure 2 is a longitudinal section therethrough taken substantially on the line 2—2 of Figure 1, Figure 3 is an enlarged vertical detail section taken substantially on the line 3—3 of Figure 1, Figure 4 is a detailed elevation of one of the hangers, Figure 5 is a detailed transverse section taken substantially on the line 5—5 of Figure 4, Figure 6 is an enlarged sectional elevation of the adjoining ends of the tongue and frame lever, Figure 7 is an enlarged detail transverse section taken substantially on the line 7—7 of Figure 4, Figure 8 is an enlarged detail section taken substantially on the line 8—8 of Figure 2.

Referring to the drawing in detail, it will be seen that the numeral 5 denotes the wheels of the apparatus which are mounted on the axle bar 6 the intermediate portion of which is offset upwardly and forwardly. This offset portion of the axle bars is denoted specifically by the numeral 7. Bars 8 are attached to the portion 7 and project forwardly and substantially horizontally therefrom. Cross beams 9 and 10 are attached to bars 8 transversely thereof by U-bolts 11 or in any other suitable manner. Side bars 12 are attached to the ends of the cross beam 10 by U-bolts 13 or in any other suitable manner and project rearwardly of the axle bar 6 and have attached to their rear ends a spring bar 14 extending transversely and supporting intermediate its ends a driver's seat 15. A frame lever 16 is mounted to swing horizontally on a king bolt 17 that projects through the forward portion of the lever 16 and through the center of the forward transverse beam 10 and also through a brace 18 which extends rearwardly and upwardly and is attached to the lever 16 as at 19. Hinge elements 20 are attached to the forward extremity of the lever 16 one to each side thereof and project forwardly thereof. The numeral 21 denotes a tongue which is provided with a pair of hinge elements 22 that project rearwardly therefrom and are connected by a pivot pin 23 to the ends of the elements 20. An equalizer 24 is pivotally mounted intermediate its ends below the rear portion of the tongue by bolt 25 which is braced as at 25′. Brackets 27 extend forwardly from the ends of the equalizer 24 and support depending rods 26 having a plurality of apertures 28 for engagement by connecting means 29 for whiffle trees 26. A toothed arcuate segment bar 30 rises from an intermediate portion of the frame lever 16. A bar 31 is attached to the rear portion of the tongue 21 by means of brackets 32 and 33 and extends rearwardly therefrom over the lever 16 and has a dog 34 engageable with the teeth of the segment bar 30 whereby the tongue may be swung vertically. It will be seen that the tongue 21 may be swung horizontally by swinging the lever 16 horizontally. Thus the cultivator may be properly guided to obtain the maximum efficiency and the digging depth of the cultivating element may be controlled as will be apparent as the description proceeds. A pair of rods 36 depend from the forward ends of each of bars 8 and 12 and also from the intermediate portions thereof and are braced by rods 37. U-shaped hangers 39 have their extremities pivoted by bolts 40 between the lower extremities of the rods 36 so that the bights extend transversely of the cultivator. On each bight of each hanger 37 there is mounted a substantially semi-cylindrical member 40 and a plate 41 to completely encase said device. Said members 40 and 41 are held in place by U-bolts 42. Plates 43 have openings 44 to receive the bights of the hangers 37 and one plate is disposed at each end thereof being held in place by U-bolts 45. Beams 46 are attached to the plate 41 to extend longitudinally of the cultivator one to each side thereof. Springs 47 are attached to the beams 46 at their forward and rear ends and are attached to chains 48 which in turn are attached to bell crank levers 49 and 50 connected together by links 51. These bell crank levers 49 and 50 are mounted respectively at the front and rear of the side bars 12. The levers 50 have pawls 41 engaged with an arcuate toothed rack segment 42 on the rear portions of the bars 12 so that the levers may be held in different adjusted positions for raising and lowering the beams 46. Comparatively strong springs 53 are attached to the intermediate portions of the beams 46 and to the forward portions of the bars 12 and tend to hold the beams 46 in either a raised or a lowered position. Thus as the beams 46 are raised from their lowered position the spring 53 will be tensioned until the beams 46 rise to a certain distance and then the springs will tend to come back and lift the beams 46 further upwardly and vice versa. Brackets 60 depend from the forward ends of the bar operated by the means 46 and are braced as at 61 and have apertures 62 to be engaged by links 63 which are engaged with the rods 26.

It is thought that the construction, operation and advantages of this invention will now be quite apparent to those skilled in this art without a more detailed description thereof. It will be apparent that the present embodiment of the invention has been disclosed merely by way of example since in actual practice it attains the features of advantages enumerated as desirable in the statement of the invention and the above description. Changes in the details of construction, and in the combination and arrangement of parts may be resorted to without departing from the spirit or scope of the invention as hereinafter claimed or sacrificing any of its advantages.

Having thus described my invention, what I claim as new is:—

1. A cultivator of the class described, comprising a wheeled frame, bracket rods depending from the frame, U-shaped hangers having their extremities pivotally engaged in the bracket rods, beams attached to the bights of the hangers, cultivating elements on the beams, bell crank levers on the frame, means connecting the bell crank levers with the beams, means connecting the bell crank levers together, means for operating the bell crank levers, springs attached to the beams and to the frame so as to urge the cultivating elements on the beams into engagement with the ground and to tend to lift the beams after they have been lifted a predetermined distance.

2. A cultivating apparatus of the class described, comprising a pair of wheels, an axle bar on which said wheels are journaled at the ends thereof, the intermediate portion of the axle bar being offset upwardly and forwardly, a pair of bars having their rear ends fixed to the intermediate portions of the axle bar and projecting forwardly therefrom, cross beams extending transversely of the pair of bars, one adjacent the forward ends thereof and one adjacent the rear ends thereof, a pair of side bars fixed to the cross beams and extending rearwardly of the axle thereof, a pair of beams, cultivating implements on the beams, and rods depending from the bars, U-shaped hangers having extremities journaled in the rods, means attaching the beams to the bights of the hangers, cultivating implements on the pair of beams.

3. A cultivating apparatus of the class described, comprising a pair of wheels, an axle bar on which said wheels are journaled at the ends thereof, the intermediate portion of the axle bar being offset upwardly and forwardly, a pair of bars having their rear ends fixed to the intermediate portions of the axle bar and projecting forwardly therefrom, cross beams extending transversely of the pair of bars, one adjacent the forward ends thereof and one adjacent the rear ends thereof, a pair of side bars fixed to the cross beams and extending rearwardly of the axle thereof, a pair of beams, cultivating implements on the beams, and rods depending from the bars, U-shaped hangers having extremities journaled in the rods, means attaching the beams to the bights of the hangers, cultivating implements on the pair of beams, a pair of bell crank levers on each side bar, a link connecting said bell crank lever, and means connecting said bell crank levers with said pair of beams whereby they may be raised or lowered.

4. A cultivating apparatus of the class described, comprising a pair of wheels, an axle bar on which said wheels are journaled at the ends thereof, the intermediate portion of the axle bar being offset upwardly and forwardly, a pair of bars having their rear ends fixed to the intermediate portions of the axle bar and projecting forwardly therefrom, cross beams extending transversely of the pair of bars, one adjacent the forward ends thereof and one adjacent the rear ends thereof, a pair of side bars fixed to the cross beams and extending rearwardly of the axle thereof, a pair of beams, cultivating implements on the beams, and rods depending from the bars, U-shaped hangers having extremities, journaled in the rods, means attaching the beams to the bights of the hangers, cultivating implements on the pair of beams, a pair of bell crank levers on each side bar, a link connecting said bell crank lever, and means connecting said bell crank levers with said pair of beams whereby they may be raised or lowered, springs attached to the forward ends of the side bars and intermediate portions of the pair of beams.

5. A cultivating apparatus of the class described, comprising a pair of wheels, an axle bar on which said wheels are journaled at the ends thereof, the intermediate portion of the axle bar being offset upwardly and forwardly, a pair of bars having their rear ends fixed to the intermediate portions of the axle bar and projecting forwardly therefrom, cross beams extending transversely of the pair of bars, one adjacent the forward ends thereof and one adjacent the rear ends thereof, a pair of side bars fixed to the cross beams and extending rearwardly of the axle thereof, a pair of beams, cultivating implements on the beams, and rods depending from the bars, U-shaped hangers having extremities, journaled in the rods, means attaching the beams to the bights of the hangers, cultivating implements on the pair of beams, a pair of bell crank levers on each side bar, a link connecting said bell crank lever, and means connecting said bell crank levers with said pair of beams whereby they may be raised or lowered, springs attached to the forward ends of the side bars and intermediate portions of the pair of beams, a lever, means for pivoting the lever between the horizontal frame on the intermediate portion of the first-mentioned transverse beam, a tongue pivoted to the forward end of the lever to swing in a vertical plane, a bar rigidly fixed to the front and extending over the lever and having a pawl, a toothed member projecting upwardly from the intermediate portion of the lever, and engageable by the pawl.

In testimony whereof I affix my signature.

GEORGE W. RAY.